United States Patent
Grünig et al.

(10) Patent No.: US 11,248,508 B2
(45) Date of Patent: Feb. 15, 2022

(54) RETAINING FLANGE FOR A METERING VALVE

(71) Applicant: TENNECO GMBH, Edenkoben (DE)

(72) Inventors: Volker Grünig, Neustadt (DE); Philipp Gran, Karlsruhe (DE); Timo H. Weber, Impflingen (DE)

(73) Assignee: Tenneco GmbH, Edenkoben (DE)

( * ) Notice: Subject to any disclaimer, the term of this patent is extended or adjusted under 35 U.S.C. 154(b) by 0 days.

(21) Appl. No.: 17/048,986

(22) PCT Filed: Apr. 17, 2019

(86) PCT No.: PCT/EP2019/059897
§ 371 (c)(1),
(2) Date: Oct. 19, 2020

(87) PCT Pub. No.: WO2019/201981
PCT Pub. Date: Oct. 24, 2019

(65) Prior Publication Data
US 2021/0239023 A1 Aug. 5, 2021

(30) Foreign Application Priority Data
Apr. 20, 2018 (DE) .................... 10 2018 109 529.5

(51) Int. Cl.
*F01N 3/00* (2006.01)
*F01N 3/20* (2006.01)
*F01N 13/18* (2010.01)

(52) U.S. Cl.
CPC ....... *F01N 3/2073* (2013.01); *F01N 13/1844* (2013.01); *F01N 2260/10* (2013.01); *F01N 2610/02* (2013.01); *F01N 2610/1453* (2013.01)

(58) Field of Classification Search
CPC ........... F01N 3/2073; F01N 2610/1453; F01N 2610/02; F01N 13/1844; F01N 3/2066; F01N 13/1805
(Continued)

(56) References Cited

U.S. PATENT DOCUMENTS 1,035,782 A * 8/1912 Fowler .................... F21V 21/02
248/343
5,102,090 A * 4/1992 Farris ...................... F16M 7/00
248/674
(Continued)

FOREIGN PATENT DOCUMENTS

DE 102011077972 A1 12/2012
DE 102015103189 A1 9/2015

*Primary Examiner* — Jason D Shanske
(74) *Attorney, Agent, or Firm* — Harness, Dickey & Pierce, P.L.C.

(57) ABSTRACT

The disclosure relates to a retaining flange for a metering valve for an exhaust gas cleaning module of an exhaust gas system of a combustion engine, wherein the retaining flange has a base plate having a central recess with a central axis for receiving the metering valve, wherein the base plate has a mounting surface via which the retaining flange can be positioned on the exhaust gas cleaning module in the region of a supply opening of the exhaust gas cleaning module, wherein a valve surface is provided opposite the mounting surface against which the metering valve can be positioned and wherein at least one retaining arm having a retaining eyelet with a central axis and for a retaining means is provided, on which the metering valve can be at least indirectly fixed, such that the at least one retaining arm has a root connecting to the base plate, from which the retaining arm extends in the radial direction relative to the central axis and in the circumferential direction about the central axis, wherein the root and the retaining eyelet are arranged offset to one another in the circumferential direction.

11 Claims, 4 Drawing Sheets

(58) Field of Classification Search
USPC .......................................................... 60/286
See application file for complete search history.

(56) References Cited

U.S. PATENT DOCUMENTS

| | | | |
|---|---|---|---|
| 5,524,860 A * | 6/1996 | Ives | F04B 39/12 |
| | | | 248/674 |
| 6,996,976 B2 * | 2/2006 | Rumminger | F01N 13/008 |
| | | | 204/421 |
| 8,024,922 B2 | 9/2011 | van Vuuren et al. | |
| 2008/0236147 A1 | 10/2008 | Van Vuuren et al. | |
| 2008/0295500 A1 | 12/2008 | Cox et al. | |
| 2010/0024406 A1 * | 2/2010 | Pollitt | F01N 3/2066 |
| | | | 60/310 |
| 2010/0107614 A1 * | 5/2010 | Levin | F01N 3/36 |
| | | | 60/303 |
| 2013/0219871 A1 * | 8/2013 | Crandell | F01N 3/2066 |
| | | | 60/295 |
| 2013/0223910 A1 | 8/2013 | Anderson | |
| 2015/0135683 A1 * | 5/2015 | Petry | F01N 3/2006 |
| | | | 60/286 |
| 2015/0252711 A1 | 9/2015 | Muruganantham et al. | |
| 2016/0160735 A1 | 6/2016 | Kapale et al. | |
| 2016/0201539 A1 * | 7/2016 | Tongu | F01N 3/035 |
| | | | 422/171 |
| 2018/0023446 A1 * | 1/2018 | Dimpelfeld | B01F 3/04049 |
| | | | 60/301 |
| 2018/0328249 A1 * | 11/2018 | Upadhye | F02M 53/043 |
| 2018/0328250 A1 * | 11/2018 | Upadhye | F02M 51/0678 |

* cited by examiner

RETAINING FLANGE FOR A METERING VALVE

CROSS-REFERENCE TO RELATED APPLICATIONS

This application is a U.S. National Phase Application under 35 U.S.C. 371 of International Application No. PCT/EP2019/059897, filed on Apr. 17, 2019, which claims the benefit of German Patent Application No. 10 2018 109 529.5, filed on Apr. 20, 2018. The entire disclosures of the above applications are incorporated herein by reference.

FIELD

The disclosure relates to a holding flange for a metering valve for an exhaust gas purification module of an exhaust system of an internal combustion engine, wherein the holding flange has a base plate having a central recess with a central axis for receiving the metering valve, wherein the base plate has a bearing surface, via which the holding flange can be brought to rest on the exhaust gas purification module in the region of a supply opening of the exhaust gas purification module, and wherein at least one holding arm having a retaining lug with a central axis for a holding means is provided, where said holding arm can be fixed to the exhaust system, wherein there is provided opposite the bearing surface a valve surface, against which the metering valve can be brought to rest.

BACKGROUND

This section provides background information related to the present disclosure which is not necessarily prior art.

A holding flange for a metering valve is already known from U.S. Pat. No. 8,024,922 B2. The holding flange is thereby configured as an annular disk having a central recess, on which the metering valve is positioned. In addition, three holding arms are provided, by means of which the metering valve is fastened to an exhaust system.

DE 10 2015 103 189 A1 describes a system and a method for a SCR system. The injector is, in this case, mounted utilizing a flat thermal insulator.

US 2013 0223910 A1 describes a receptacle for a pulse generator utilizing two holding plates which each have two locating feet.

US 2008 0295500 A1 describes a receiving housing for an injector unit having multiple cooling channels, which is mounted flat on a counter-retaining element.

SUMMARY

This section provides a general summary of the disclosure, and is not a comprehensive disclosure of its full scope or all of its features.

The object which forms the basis of the disclosure is to configure and arrange a holding flange such that an improved thermal protection of the metering valve to be received is ensured at the same time as a smaller installation space is attained.

The object is achieved according to the disclosure in that the at least one holding arm has a foot joining the base plate, from which foot the holding arm extends in a radial direction R to the central axis and in a circumferential direction U about the central axis, wherein the foot and the retaining lug are arranged offset from one another in the circumferential direction U. The result of this is that, starting from the base plate, a heat input into the retaining lug is reduced so that a heat input to the metering valve is likewise reduced. By means of the holding flange, the metering valve can be mounted directly on an exhaust gas purification module or an exhaust gas purification module housing. The holding flange can be configured in one piece so that no further intermediate elements are necessary, which have a holding function. Insulating elements can be provided. The retaining lug is thereby connected by means of a screw directly to the exhaust gas purification module or the exhaust gas purification module housing. An insulating element such as an insulating washer can be utilized.

To this end, it can also be advantageous if the at least one holding arm has, over at least 50% of its length, a cross-sectional form Q deviating from the rectangular form or the circular form, having a circumferential length L and having a cross-sectional area F, wherein the circumferential length L is increased or the cross-sectional area F is decreased compared with a rectangular form or compared with a circular form. The increased circumferential length L is accompanied by an increased area of the holding arm which brings with it an improved cooling. Additionally, the smaller cross-sectional area F is accompanied by a diminished thermal conduction via the holding arm.

It can further be advantageous if a U-shaped, T-shaped, double T-shaped, X-shaped, L-shaped, V-shaped or W-shaped cross-sectional form Q is provided. The aforementioned cross-sectional forms Q guarantee a good relationship between the circumferential length L and the cross-sectional area F.

It can also be advantageous if the retaining lug is arranged upstream in relation to the central axis by an offset V with respect to the bearing surface of the base plate. If a mounting surface of the exhaust gas purification module, to which the holding flange is fastened, is configured planarly, the retaining lug can be positioned at a distance from the mounting surface. If the mounting surface for the bearing surface and for the retaining lug has zones having a different height level, the retaining lug or its holding surface can also be arranged at the height of the bearing surface.

It can advantageously be provided that the holding arm has a radial extension R1 which is greater than the radial extension R2 of the retaining lug. This is accompanied by an increase in the length of the holding arm, which leads to a reduced heat input into the metering module.

It can be of corresponding importance for the present disclosure if the holding arm has an axial extension A2 which is greater in relation to the central axis than an axial extension A0 of the base plate and/or is greater than an axial extension A1 of the retaining lug. This is likewise accompanied by an increase in the length of the holding arm, which leads to a reduced heat input into the metering module.

In connection with the configuration according to the invention and arrangement it can be advantageous if the at least one holding arm has a width B1 in the region of the link to the base plate, and a smaller width B2 over its further course. A decrease or tapering of the cross-section is accompanied by a diminished thermal conduction.

It can further be advantageous if at least one cheek is provided on the base plate, which cheek protrudes in the direction of the central axis axially over the base plate, wherein the at least one holding arm is connected by means of the cheek to the base plate. Each holding arm preferably has its own protruding cheek. The protrusion of the cheek is preferably at least as high as the holding arm is thick. If a linking surface between the cheek and the base plate is smaller than a cross-sectional area of the foot of the holding arm, the heat input from the base plate into the holding arm is reduced. The area of the cheek additionally serves as a cooling area so that the heat input into the foot per se is diminished.

Furthermore, it can be advantageous if the at least one holding arm is a part of the holding flange and, together with the base plate, forms a modular unit. It is true that a heat transfer between the base plate and the holding arm is consequently optimized, however significantly lower material costs, manufacturing costs and mounting costs are achieved.

It can further be advantageous if two or three holding arms are provided. Three holding arms are the preferred variant.

The object is additionally achieved by a modular unit having an exhaust gas purification module and a mounted holding flange, wherein the retaining lug is arranged in relation to the central axis at a distance a from the exhaust gas purification module. The existing distance prevents a heat input due to thermal conduction. The holding means such as, for example, a screw, should also be located at a distance from the exhaust gas purification module.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further advantages and details of the disclosure are explained in the claims and in the description and depicted in the figures, wherein:

Corresponding reference numerals indicate corresponding parts throughout the several views of the drawings.

DETAILED DESCRIPTION

Example embodiments will now be described more fully with reference to the accompanying drawings.

Figure 1:
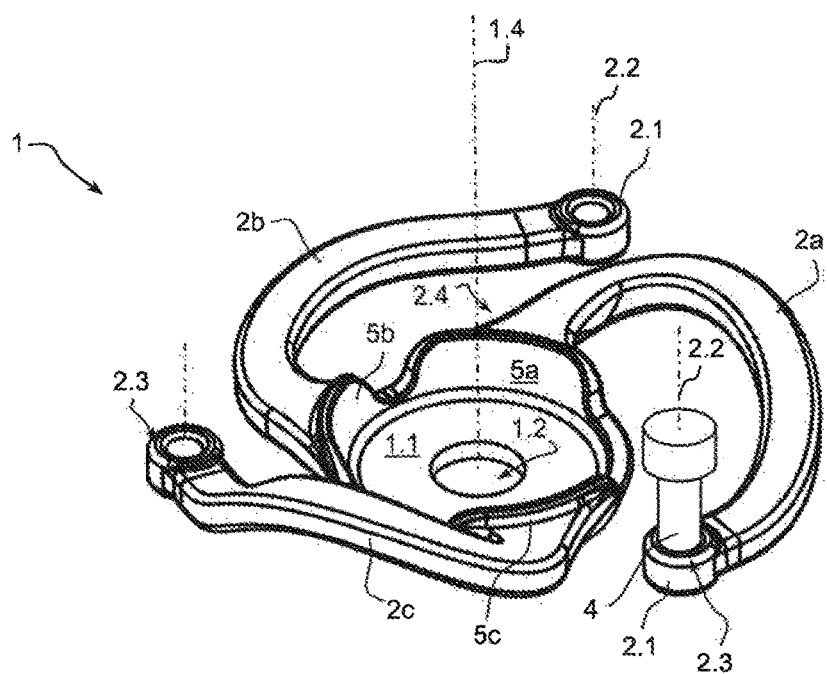
FIG. 1 shows a perspective view of a holding flange.
Figure 1A:
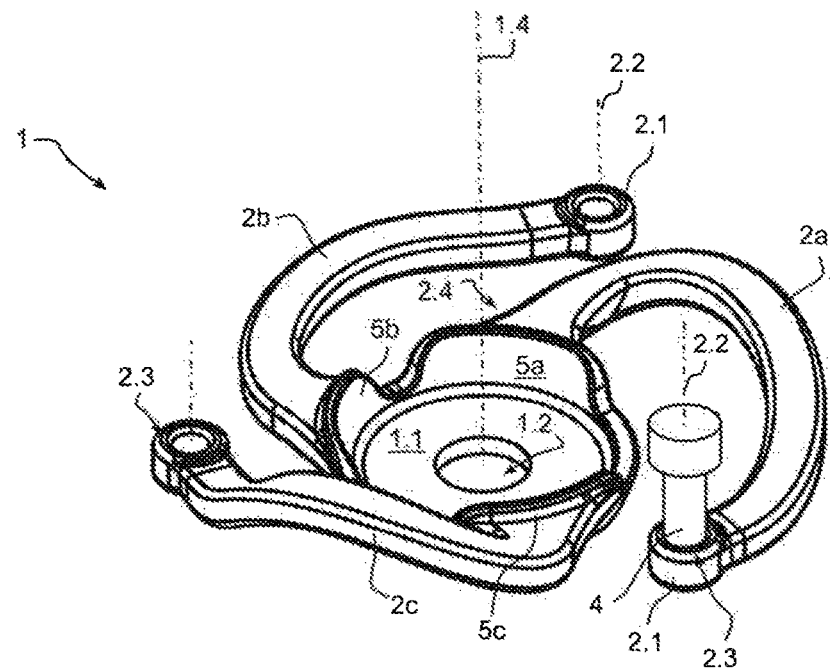
FIG. 1a shows a perspective view of the holding flange having a holding means.
Figure 1B:
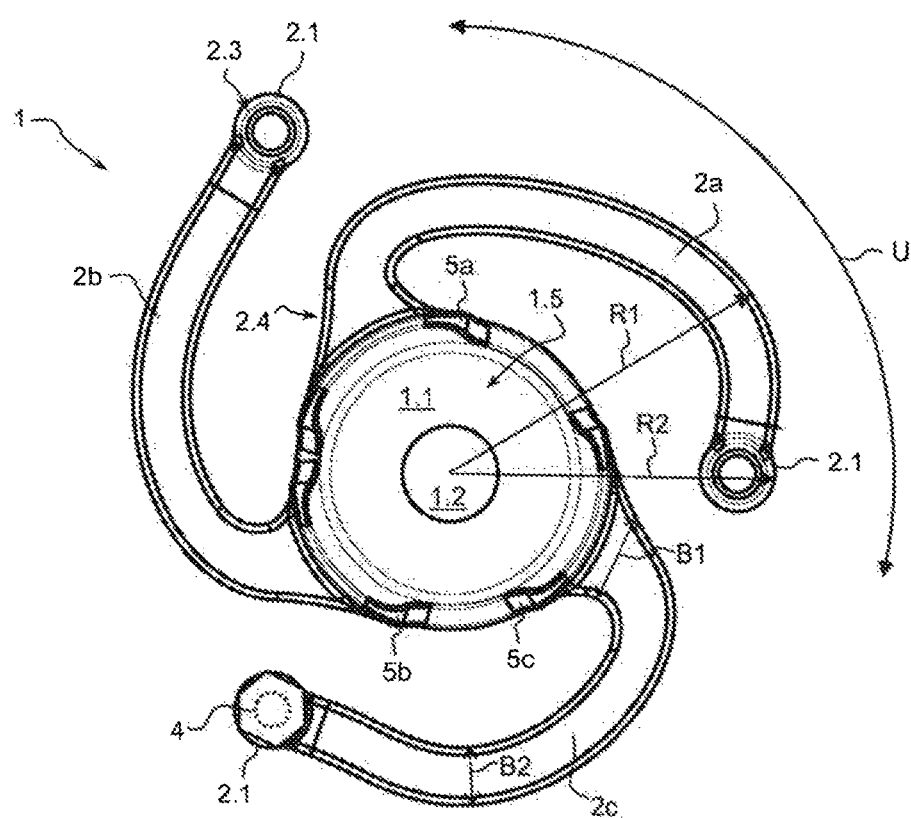
FIG. 1b shows the holding flange in a view from above.

The one-piece holding flange 1 according to FIG. 1a, 1b has a base plate 1.1 having a central axis 1.4 and a valve surface 1.5 for supporting a metering valve 10. The holding flange 1 additionally has a bearing surface 1.3, via which a bearing is effected at a supply opening 11.1 of an exhaust gas purification module 11 according to FIG. 2 and FIG. 5. Within the base plate 1.1, a recess 1.2 is provided, through which an additive can be delivered into the exhaust gas purification module 11.

For the purpose of fastening the holding flange 1 to the exhaust gas purification module 11, the latter has three holding arms 2a, 2b, 2c which each have a retaining lug 2.1 at the end with a central axis 2.2 for a holding means such as, for example, a screw 4. The respective holding arm 2a, 2b, 2c has a foot 2.4 and is connected by means of a cheek 5a, 5b, 5c to the base plate 1.1, wherein the cheek 5a, 5b, 5c protrudes over the base plate 1.1 in relation to the central axis 1.4. The cheek 5a, 5b, 5c is exposed on its side opposite the holding arm 2a, 2b, 2c. The respective holding arm 2a, 2b, 2c has a width which, starting from a width B1 in the region of the cheek 5a, 5b, 5c or respectively in the region of its foot 2.4, drops to a minimum value B2 which is utilized over a large part of the length.

The respective holding arm 2a, 2b, 2c has a relatively large length so that the respective retaining lug 2.1 is arranged offset by approximately 110° in the circumferential direction U with respect to the respective cheek 5a, 5b, 5c as a bearing point on the base plate 1.1. The respective holding arm 2a, 2b, 2c additionally has, in the region of the retaining lug 2.1, a radial extension R2 which is smaller than its radial extension R1 between the respective cheek 5a, 5b, 5c and the respective retaining lug 2.1. In addition, as can be seen according to FIG. 2, the axial extension A2 of the holding arm 2a, 2b, 2c is greater than the axial extension A1 of the retaining lug 2.1 between the respective cheek 5a, 5b, 5c and the respective retaining lug 2.1. The respective holding arm 2a, 2b, 2c has a maximized length so that the distance of the respective retaining lug 2.1 from the respective cheek 5a, 5b, 5c is maximized.

Figure 2:
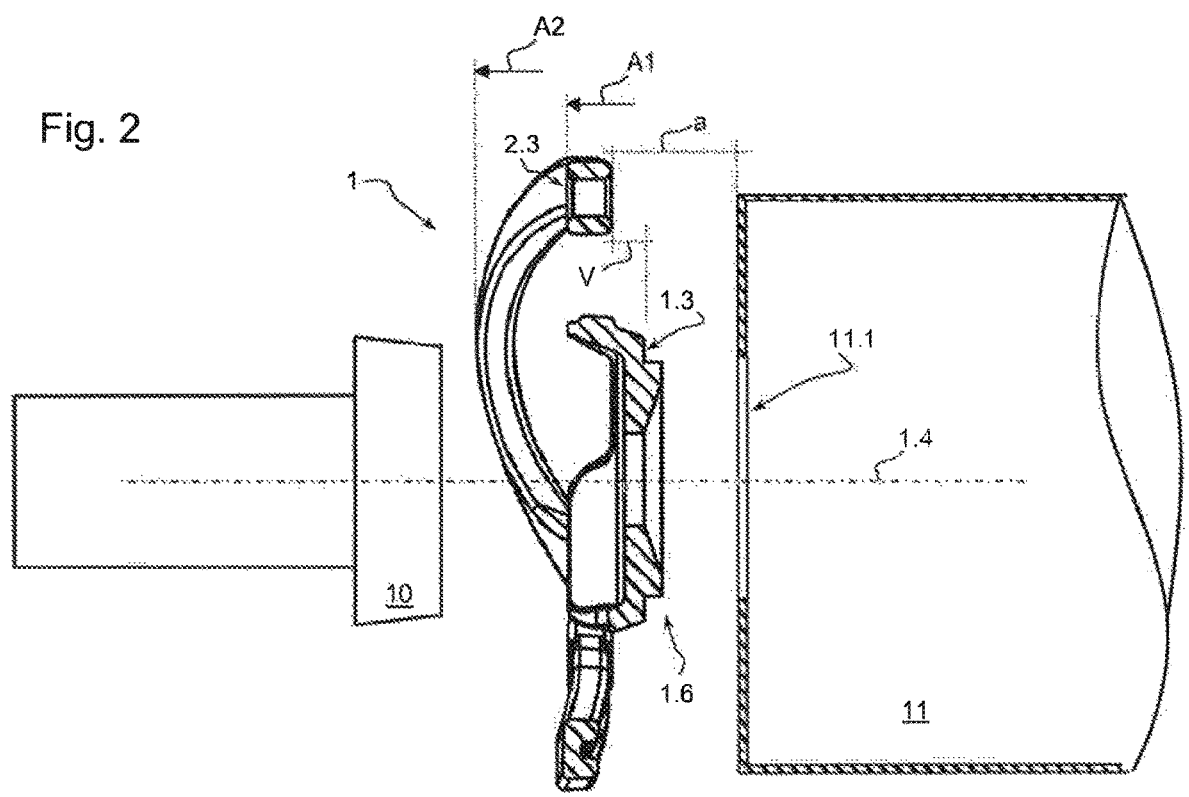
FIG. 2 shows a cross-section of the holding flange having a metering valve and an exhaust gas purification module.

As can likewise be seen from FIG. 2, the respective retaining lug 2.1 has an offset V with respect to the bearing surface 1.3 so that the respective retaining lug 2.1 has a distance a from the exhaust gas purification module 11 or an edge of the supply opening 11.1 (depicted here in an exploded representation).

An insulating element (not depicted) can be provided on the bearing surface 1.3 of the holding flange 1, via which the holding flange 1 is insulated with respect to the exhaust gas purification module 11. In addition or alternatively, an insulating element (not depicted) can be provided between the retaining lug 2.1 and the exhaust gas purification module 11. Consequently, account is in particular taken of the radiation heat so that the existing insulation is further improved beyond the air gap.

Figure 3A:
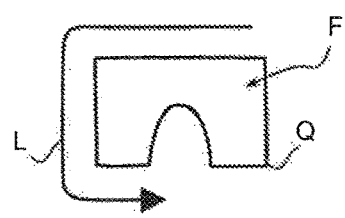
FIG. 3a shows a schematic diagram of the cross-section of the holding arm.
Figure 3B:
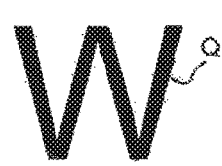
FIG. 3b-3g show alternative cross-sectional forms.
Figure 3C:
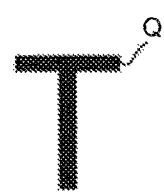
Figure 3D:
Figure 3E:
Figure 3F:
Figure 3G:

In accordance with FIG. 3a, the respective holding arm 2a, 2b, 2c has a U-shaped cross-sectional form Q. The U-shaped cross-sectional form Q has a circumferential length L which is increased compared with a rectangular cross-sectional form Q having the same area moment of inertia. The U-shaped cross-sectional form Q additionally has a cross-sectional area F which is decreased compared with a rectangular cross-sectional form Q having the same area moment of inertia. In accordance with the exemplary embodiments in FIGS. 3b-3g, other cross-sectional forms Q are also possible such as W-shaped, T-shaped, double T-shaped, X-shaped, L-shaped or V-shaped.

Figure 4:
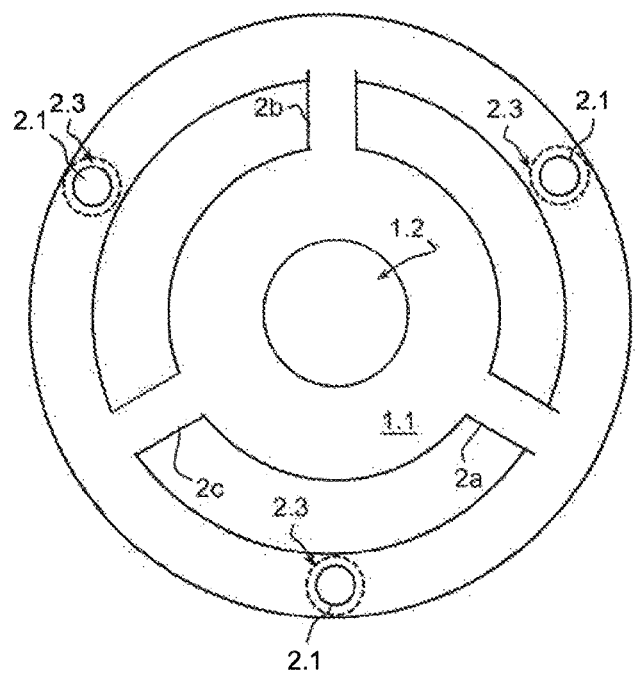
FIG. 4 shows an alternative embodiment of the holding flange in a view from above.

In the case of the alternative exemplary embodiment according to FIG. 4, the parts of the holding arms 2a, 2b, 2c extending in the circumferential direction U are connected to one another and form a retaining ring 2d which surrounds the base plate 1.1, wherein said retaining ring 2d is connected via the radially extending part of the three holding arms 2a, 2b, 2c to the base plate 1.1. The respective retaining lug 2.1 is provided in the retaining ring 2d and is arranged offset by approximately 60° in the circumferential direction U with respect to the closest holding arm 2a, 2b, 2c as a bearing point on the base plate 1.1.

Figure 5:
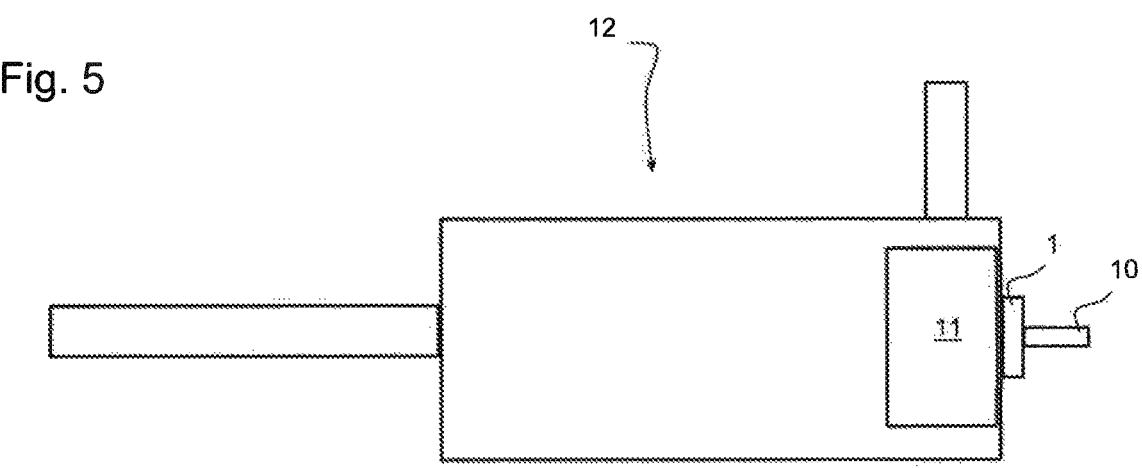
FIG. 5 shows a schematic diagram of a holding flange having a metering valve and an exhaust gas purification module integrated into an exhaust system.

According to FIG. 5, the holding flange 1 having the metering valve 10 and the exhaust gas purification module 11 is integrated into an exhaust system 12. The bearing surface 1.3 of the holding flange 1 rests against the exhaust gas purification module 11. The holding flange has, in the region of the bearing surface 1.3, a shoulder 1.6 which is inserted into the supply opening 11.1. In addition to this positive fit in the radial direction, the base plate 1.1 and the exhaust gas purification module 11 are welded. The metering valve 10 is detachably connected via the holding means 4 to the exhaust gas purification module 11. The retaining lug 2.1 has a holding surface 2.3 to which the metering valve 10 is fastened.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A holding flange for a metering valve for an exhaust gas purification module of an exhaust system of an internal combustion engine, wherein the holding flange has a base plate having a central recess with a first central axis for receiving the metering valve, wherein the base plate has a bearing surface, via which the holding flange is restable on the exhaust gas purification module in the region of a supply opening of the exhaust gas purification module, wherein there is provided opposite the bearing surface a valve surface, against which the metering valve is restable and wherein at least one holding arm having a retaining lug with a second central axis for a holding means is provided, to which at least one holding arm the metering valve is at least indirectly fixable, wherein the at least one holding arm has a foot joining the base plate, from which foot the at least one holding arm extends in a radial direction R to the first central axis and in a circumferential direction around the first central axis, wherein the foot and the second central axis of the retaining lug are arranged offset from one another in the circumferential direction.

2. The holding flange according to claim 1, wherein the at least one holding arm has, over at least 50% of its length, a cross-sectional form deviating from the rectangular form or the circular form, having a circumferential length and having a cross-sectional area, wherein the circumferential length is increased or the cross-sectional area is decreased compared with a rectangular or circular form.

3. The holding flange according to claim 2, wherein a U-shaped, T-shaped, double T-shaped, X-shaped, L-shaped, V-shaped or W-shaped cross-sectional form is provided.

4. The holding flange according to claim 1, wherein the retaining lug is arranged upstream in relation to the first central axis by an offset V with respect to the bearing surface of the base plate.

5. The holding flange according to claim 1, wherein the at least one holding arm has a radial extension which is greater than the radial extension of the retaining lug.

6. The holding flange according to claim 1, wherein the at least one holding arm has an axial extension which is greater in relation to the second central axis than an axial extension of the retaining lug.

7. The holding flange according to claim 1, wherein the at least one holding arm has a width in the region of its connection to the base plate, and a smaller width at an end of the at least one holding arm disposed away from the base plate.

8. The holding flange according to claim 1, wherein at least one cheek is provided on the base plate, which at least one cheek protrudes in the direction of the first central axis axially over the base plate, wherein the at least one holding arm is connected by means of the at least one cheek to the base plate.

9. The holding flange according to claim 1, wherein the at least one holding arm is a part of the holding flange and, together with the base plate, forms a modular unit.

10. The holding flange according to claim 1, wherein one or two holding arms are provided in addition to the at least one holding arm.

11. A modular unit having an exhaust gas purification module mounted to the holding flange of claim 1, wherein the retaining lug is arranged in relation to the first central axis at a distance from the exhaust gas purification module.

* * * * *